United States Patent
Keithley et al.

(10) Patent No.: US 8,120,632 B1
(45) Date of Patent: Feb. 21, 2012

(54) ALLIGNMENT OF COLOR PLANES IN MULTI-BEAM MULTI-PASS PRINTERS

(75) Inventors: Douglas G. Keithley, Boise, ID (US); Gregory L. Unruh, Boise, ID (US)

(73) Assignee: Marvell International Ltd., Hamilton (BM)

( * ) Notice: Subject to any disclaimer, the term of this patent is extended or adjusted under 35 U.S.C. 154(b) by 824 days.

(21) Appl. No.: 12/171,123

(22) Filed: Jul. 10, 2008

Related U.S. Application Data

(60) Provisional application No. 60/950,438, filed on Jul. 18, 2007.

(51) Int. Cl.
*B41J 2/435* (2006.01)
*B41J 2/47* (2006.01)

(52) U.S. Cl. ............... 347/234; 347/229; 347/248

(58) Field of Classification Search ............ 347/116, 347/229, 234, 235, 248–250; 399/301
See application file for complete search history.

(56) References Cited

U.S. PATENT DOCUMENTS

| | | | | |
|---|---|---|---|---|
| 6,573,919 B2 * | 6/2003 | Benear et al. | | 347/116 |
| 7,061,514 B2 * | 6/2006 | LeVake et al. | | 347/116 |
| 7,197,255 B2 * | 3/2007 | Yamada | | 399/51 |
| 2008/0007745 A1 * | 1/2008 | Johnston | | 358/1.6 |

* cited by examiner

*Primary Examiner* — Hai C Pham

(57) ABSTRACT

Methods and apparatuses that facilitate the alignment of multiple color planes of a latent image in a multi-beam multi-pass printer are described herein. The novel methods includes determining, during a first pass of a transfer medium of a multi-beam printer, a first time interval between when at least one light beam from a multi-beam device is detected and when a top of a page is detected at a selected location of the transfer medium, the multi-beam device including a plurality of light beam sources, and the first pass to form a first color plane of a latent image on the transfer medium. The methods further include selecting, based at least in part on the determined first time interval, a first one of the plurality of light beam sources to begin illuminating the transfer medium to create the first color plane on the transfer medium during the first pass of the transfer medium.

58 Claims, 8 Drawing Sheets

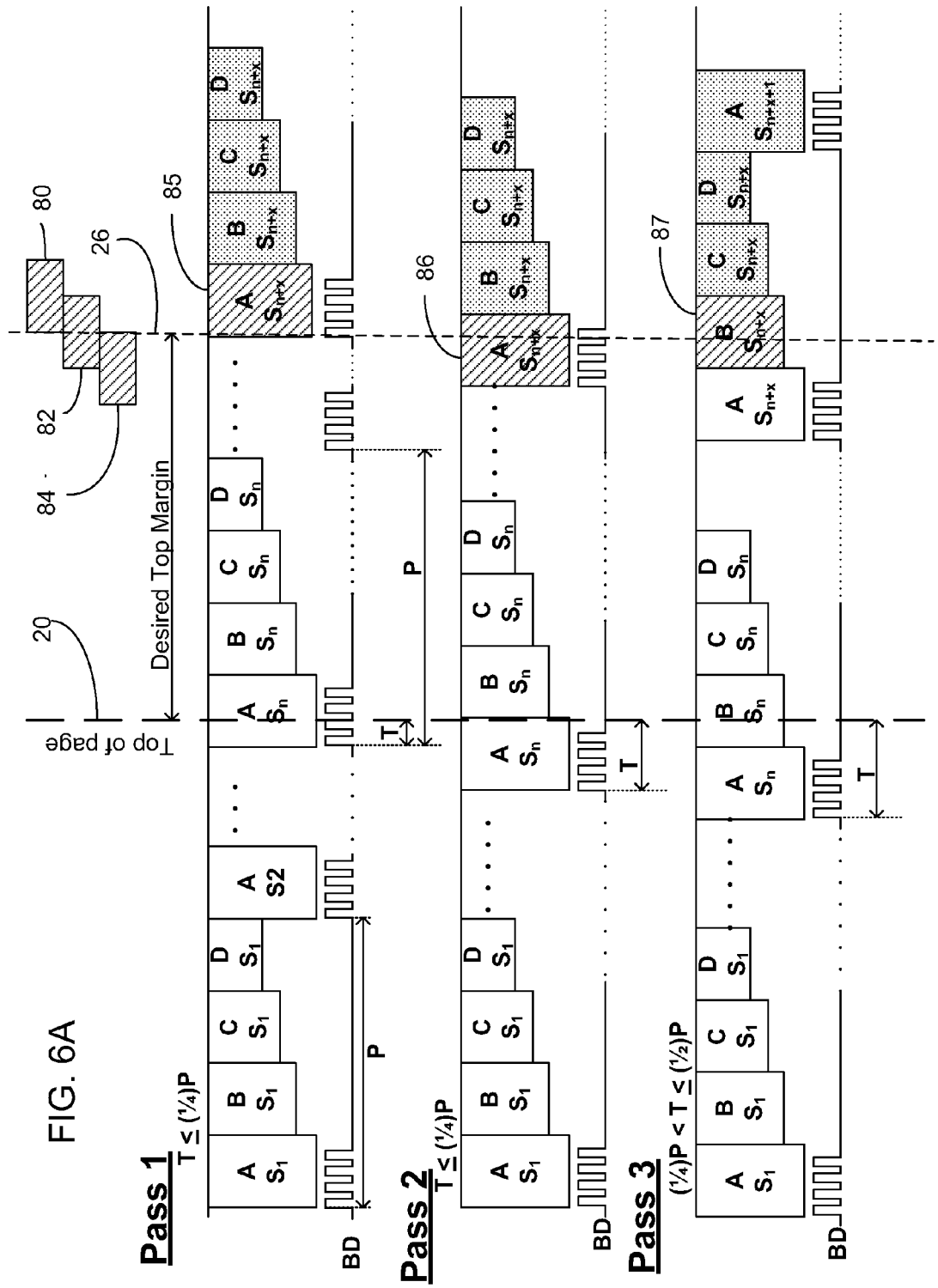

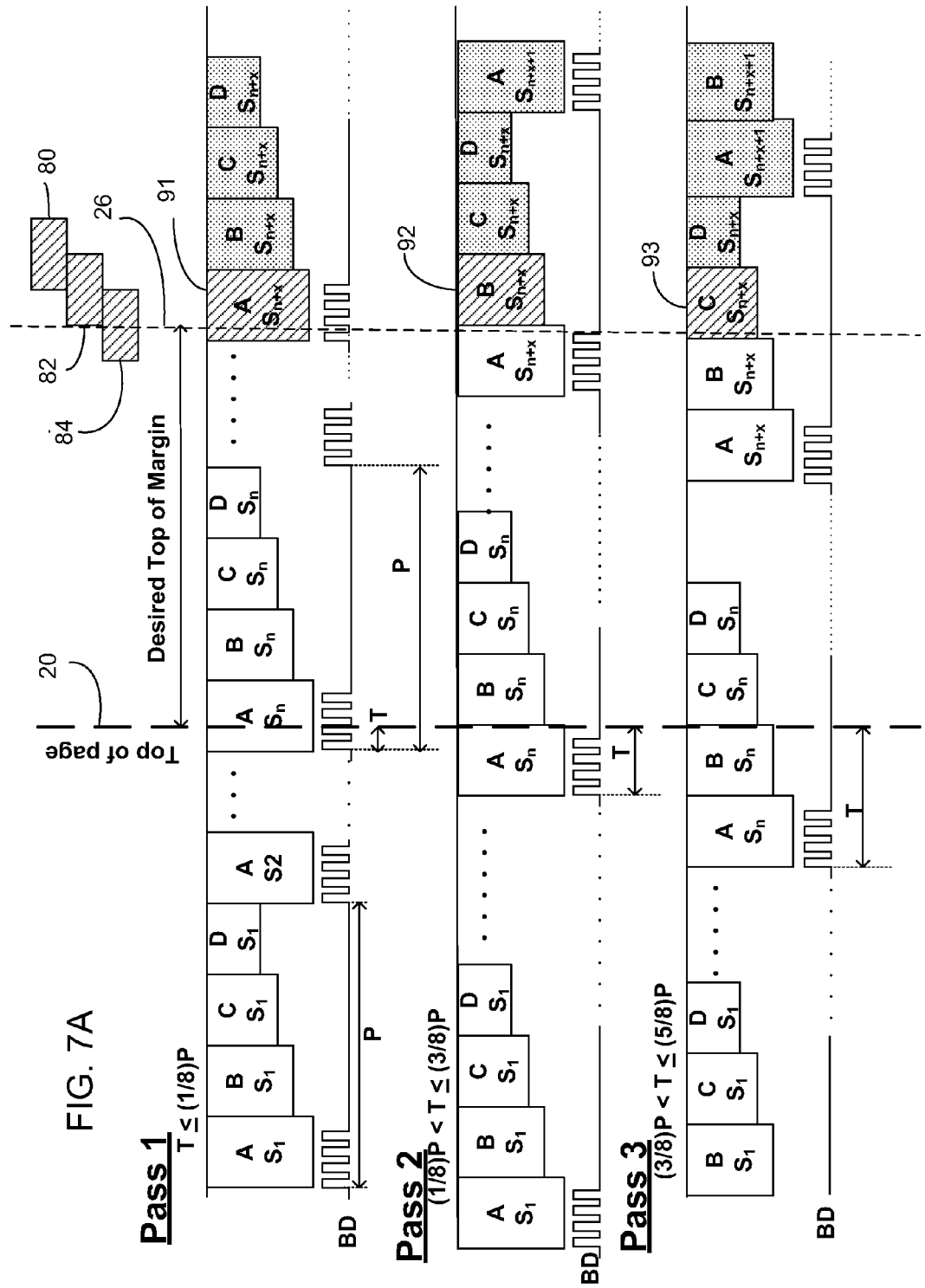

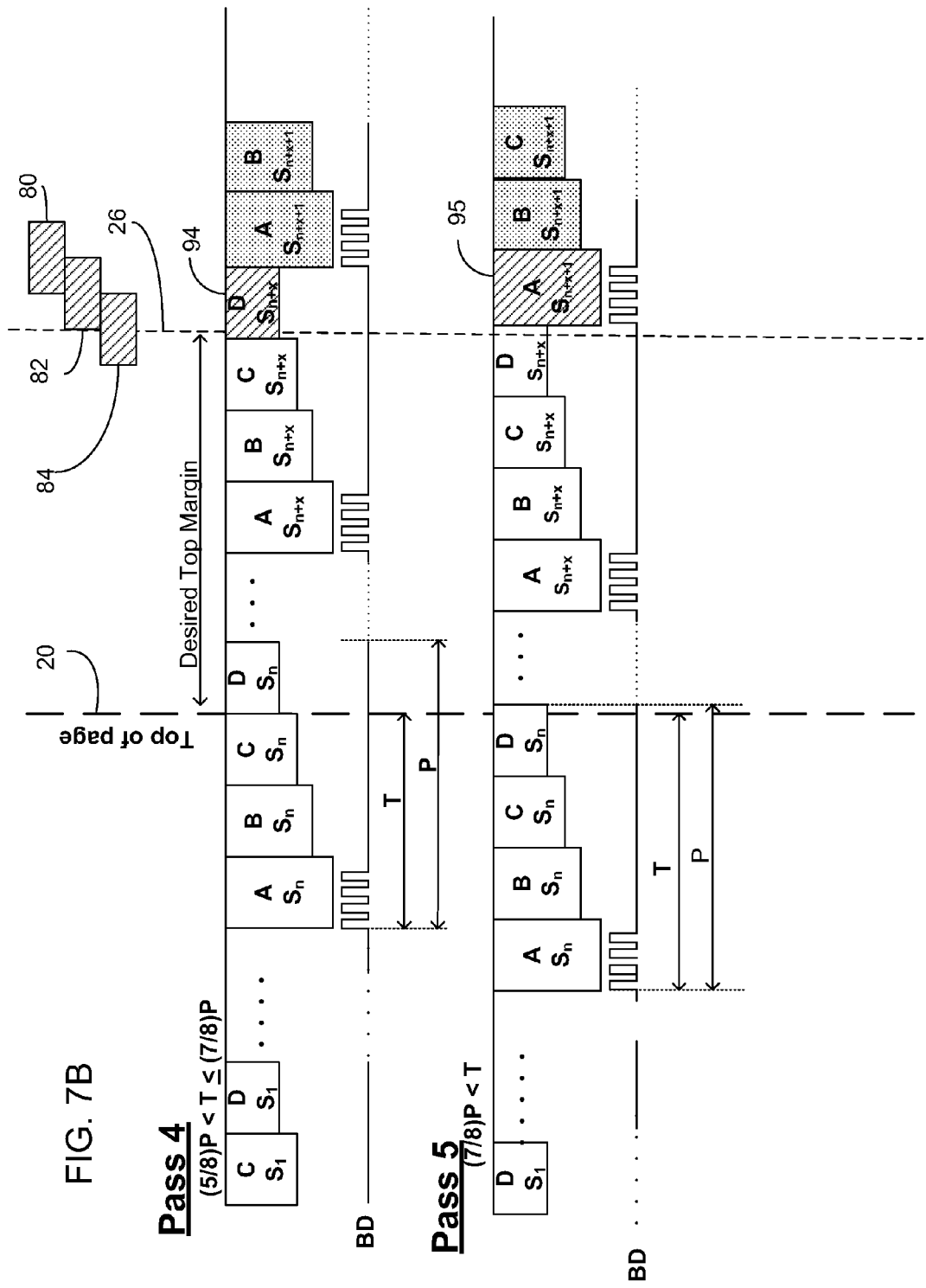

ALLIGNMENT OF COLOR PLANES IN MULTI-BEAM MULTI-PASS PRINTERS

CROSS-REFERENCES TO RELATED APPLICATIONS

The present application claims priority to U.S. Patent Application No. 60/950,438, filed Jul. 18, 2007, entitled "Multi-pass Color Laser Printer Multi-Beam Alignment," the entire disclosure of which is hereby incorporated by reference in its entirety for all purposes.

TECHNICAL FIELD

Embodiments of the present invention relate to the field of printers, and more particularly, to multi-pass multi-beam printers.

BACKGROUND

Laser printers have become increasingly popular with consumers due to their superior performance and rapidly declining price tags. These devices typically employ light beam sources such as laser diodes in order to generate highly focused beams of light that are used in order to print images onto a print medium such as paper.

The basic principles of monochromatic laser printers and color laser printers are well known and are similar. For example, single beam monochromatic laser printers will typically employ, in addition to a light beam source, various optical components and at least one transfer medium where an electrostatic latent image of the desired image to be printed is typically formed. In such devices, the light beam source (e.g., laser diode) is used to initially "draw" an electrostatic latent image (herein "latent image") onto the transfer medium. More particularly, the highly focused light beam generated by the light beam source may be directed to the surface of the transfer medium via the printer's optical system (which typically includes the light beam source, one or more lens, and one or more mirrors), in order to create the many scan lines that make up an electrostatic latent image.

The transfer medium is usually a photosensitive drum or a photosensitive belt that comprises a photosensitive or photo-conductive material that will discharge negative electrical charges in the form of static electricity when exposed to photons. By using a highly focused light beam generated by a light beam source, a latent image may be formed on the transfer medium. In general, the transfer medium is usually shorter than the actual image, so after toner is attracted to it, the photosensitive material needs to move the toner onto a transfer belt that is as long as the longest image or to the media itself. If the transfer is to an intermediate belt, all four colors of toner may be transferred to the belt prior to transferring to the media (usually paper). There is also the possibility of transferring the toner directly from the photosensitive material to the media and thus, no intermediate transfer belt would be needed. Such an embodiment will move the paper past the photosensitive material 4 times. The intermediate transfer belt and the media usually do not rely on being photosensitive to transfer the toner that is imaged on to the photosensitive material.

Generally, a 'Top of Page' generated from a sensor will usually be some location on the intermediate transfer belt or the edge of media itself detected along the paper path (the path the media travels throughout the printing process). It is usually not on the transfer medium since it is shorter (or the drum has a smaller circumference) than the media so a full image cannot reside on the transfer medium and will need to be transferred to something else. As used herein, transfer medium may include the transfer medium itself and an intermediate belt and/or the media itself.

In order to form an individual scan line of a latent image on the transfer medium, the optical system will initially direct the light beam to a location on the surface of the transfer medium, then move the light beam along, for example, a straight line on the surface of the transfer medium until the beam reaches an end point of the straight line. As the beam is moving along the straight line, certain characteristics of the beam may be selectively controlled and adjusted, such as light intensity, in order to create the individual pixels that make up the scan line. Once the light beam reaches the end of the straight line, a scan line is formed and the light beam source may then be turned off or at least powered down at least momentarily.

The transfer medium may then be incrementally moved and repositioned relative to the optical system, and more particularly, moved relative to the field of view of the optical system such that the optically system, which is generally stationary with respect to the transfer medium, may begin forming a new scan line that will typically be formed adjacent to the previously formed scan line. For example, if the transfer medium is a photosensitive drum, the drum may be incrementally rotated each time the optical system finishes forming a scan line. While the drum is being incrementally rotated, the optically system may be reconfigured, for example, by reconfiguring its mirror, which may be a rotating polygon scanning mirror, in order to begin forming a new scan line.

After all of the scan lines of the latent image have been formed, the latent image on the transfer medium may then be directly or indirectly used in order to print the desired image onto the print medium. That is, in some systems, the electro-static latent image formed on the transfer medium may be used to directly print the desired corresponding image onto the print medium. Alternatively, the electrostatic latent image may be transferred onto a second, and even a third, transfer medium that may ultimately be used in order to print the desired image onto the print medium. If the transfer medium is used to directly print the corresponding image onto a print medium, then a toner in the form of a positively charged black ink power may be applied to the transfer medium, the toner only clinging to the negatively charged latent image. The powdered toner clinging to the latent image may then be rolled onto the print medium, which is then heated to fuse the toner onto the print medium.

Although the above technique for creating a monochromatic image uses a single light beam source, multi-beam systems are also known in the art in which multiple light beam sources (e.g., multiple laser diodes) are used in order to concurrently form adjacent scan lines of the latent image. Such systems are sometimes referred to as "multi-beam" systems and are typically used, for example, to print monochromatic images.

As for color laser printers, the process for printing color images in such devices is slightly more complicated than the process described above for monochromatic laser printers. In some implementations, color laser printers will have components similar to those of monochromatic laser printers including a light beam source, optical components, at least one transfer medium, and black ink toner. However, in addition to having the black ink toner, such devices will typically include other color toners, which are, but not always, cyan, magenta, and yellow. In order to print a color image, the transfer medium may pass through the printer's optical system (or more particularly, pass through the field of view of the optical system) multiple times in order to create the different color planes that will together be used in order to generate the desired color image. Such a process is sometimes referred to as "multi-pass."

To further illustrate the multi-pass concept, during a first pass of the transfer medium through the optical system, a first color plane (e.g., black) of the latent image may be formed onto the transfer medium using the light beam source. During a second pass of the transfer medium, a second color plane (e.g., cyan) may be formed onto the transfer medium. During subsequent passes of the transfer medium, other color planes (e.g., magenta and yellow) may also be formed onto the transfer medium. These color planes are typically formed one on top of the other to create the color latent image.

Due to certain economic and performance needs, multi-beam/multi-pass color laser printer systems have recently been proposed. However, alignment issues may arise when multi-beam techniques are used together with multi-pass techniques that are typically not encountered in multi-pass systems that employ a single beam. That is, when misalignment of the different color planes of an image occurs, which is generally referred to as registration errors, it can cause fringing and blurring of the resulting color image. Unfortunately, the use of multiple beams in multi-pass systems adds significant complexity and increases the likelihood as well as the scope of registration errors.

SUMMARY OF INVENTION

According to various embodiments of the present invention, methods and apparatuses are provided that facilitate the alignment of multiple color planes of a latent image in a multi-beam multi-pass printer. The novel methods may include determining, during a first pass of a transfer medium of a multi-beam printer, a first time interval between when at least one light beam from a multi-beam device is detected and when a top of a page is detected at a selected location of the transfer medium, the multi-beam device including a plurality of light beam sources, and the first pass to form a first color plane of a latent image on the transfer medium. The methods may further include selecting, based at least in part on the determined first time interval, a first one of the plurality of light beam sources to begin illuminating the transfer medium to create the first color plane on the transfer medium during the first pass of the transfer medium.

In some embodiments, the methods may also include forming a first initial scan line of the first color plane at a first selected distance away from the location of the top of the page with the selected first one of the plurality of light beam sources, the first color plane having a plurality of scan lines including the first initial scan line, and the first initial scan line being nearest to the top of the page relative to the other scan lines of the first color plane. For these embodiments, the methods may also include identifying a cross scan from a plurality of cross scans, and forming the first initial scan line during the identified cross scan.

In some embodiments, the methods may further include determining, during a second pass of the transfer medium to form a second color plane on the transfer medium, a second time interval between when at least one light beam from the multi-beam device is detected and when the top of the page is detected at the selected location of the transfer medium, and selecting, based at least in part on the determined second time interval, a second one of the plurality of light beam sources to begin illuminating the transfer medium to create the second color plane on the transfer medium during the second pass of the transfer medium.

For these embodiments, the method may also include initially forming a second initial scan line of the second color plane at a second selected distance away from the location of the top of the page with the selected second one of the plurality of light beam sources, the second color plane having a plurality of scan lines including the second initial scan line, and the second initial scan line being nearest to the top of the page relative to the other scan lines of the second color plane. For some embodiments, each of the first and second initial scan lines may have a first and a second width that are equal to a width of a pixel, and the second initial scan line is disposed on the transfer medium such that the second initial scan line is not more than one pixel offset from first initial scan line.

In some embodiments, the methods may further include determining, during a third pass of the transfer medium to form a third color plane on the transfer medium, a third time interval between when at least one light beam from the multi-beam device is detected and when the top of the page is detected at the selected location of the transfer medium, and selecting, based at least in part on the determined third time interval, a third one of the plurality of light beam sources to begin illuminating the transfer medium to create the third color plane on the transfer medium during the third pass of the transfer medium. For these embodiments, the methods may also include forming a third initial scan line of the third color plane at a third selected distance away from the location of the top of the page with the selected third one of the plurality of light beam sources, the third color plane having a plurality of scan lines including the third initial scan line, and the third initial scan line being nearest to the top of the page relative to the other scan lines of the third color plane. For some embodiments, the third initial scan line may have a width that is equal to the width of the pixel, and the third initial scan line may be disposed on the transfer medium such that the third initial scan line is not more than one pixel offset from the first and second initial scan lines.

In some embodiments, the methods may further include determining, during a fourth pass of the transfer medium to form a fourth color plane on the transfer medium, a fourth time interval between when at least one light beam from the multi-beam device is detected and when the top of the page is detected at the selected location of the transfer medium, and selecting, based at least in part on the determined fourth time interval, a second one of the plurality of light beam sources to begin illuminating the transfer medium to create the fourth color plane on the transfer medium during the fourth pass of the transfer medium. For these embodiments, the methods may also include forming a fourth initial scan line of the fourth color plane at a fourth selected distance away from the location of the top of the page with the selected fourth one of the plurality of light beam sources, the fourth color plane having a plurality of scan lines including the fourth initial scan line, and the fourth initial scan line being nearest to the top of the page relative to the other scan lines of the fourth color plane. For some embodiments, the fourth initial scan line may have a width that is equal to the width of the pixel, and the fourth initial scan line may be disposed on the transfer medium such that the fourth initial scan line is not more than one pixel offset from the first, second, and third initial scan lines.

In some embodiments, the selecting based at least in part on the first time interval may include comparing the first time interval with a beam detection period to select the first one of the plurality of light beam sources, the beam detection period being an amount of time between two successive detections of light beams from the same light beam source during two successive cross scans of the transfer medium. For these embodiments, the plurality of light beam sources may include N light beam sources where N is an integer, and the comparing includes dividing the beam detection period into N time increments, associating each time increment to a corresponding one of the N light beam sources, and determining that the first time interval is within a time increment associated with the first one of the plurality of light beam sources. In some embodiments, the N time increments are equivalent time increments.

In some alternative embodiments, the comparing may include dividing the beam detection period into N+1 increments of time, associating each time increment to a corresponding one of the N light beam sources, and determining that the first time interval is within a time increment associated with the first one of the plurality of light beam sources.

In some embodiments, the detection during the first pass of the at least one light beam from the multi-beam device and the detection of the top of the page at the selected location on the transfer medium occurs during a single cross scan of the transfer medium. For these embodiments, the at least one light beam from the multi-beam device detected during the first pass is detected using a first sensor and the top of the page is detected using a second sensor.

In some embodiments of the present invention, a method is provided that includes detecting at least one light beam, detecting a top of a page at a selected location of a transfer medium, and selecting, based at least in part on said detection of the at least one beam and the detection of the top of the page, one of the plurality of light beam sources to begin illuminating the transfer medium to create a color plane on the transfer medium, said color plane being one of a plurality of color planes comprising a latent image.

In various embodiments, an apparatus is provided comprising a transfer medium to print an image onto a print medium, a multi-beam device having a plurality of light beam sources, a first sensor to detect at least one light beam generated by the multi-beam device, a second sensor to detect a top of a page located at a selected location on the transfer medium, and a controller. The controller being adapted to control the multi-beam device and to receive inputs from the first and the second sensor and configured to determine, during a first pass of the transfer medium, a first time interval between when at least one light beam from the multi-beam device is detected by the first sensor and when the top of the page is detected at a selected location of the transfer medium by the second sensor, the first pass to form a first color plane of a latent image on the transfer medium, and to select, based at least in part on the determined first time interval, a first one of the plurality of light beam sources to begin illuminating the transfer medium to create the first color plane on the transfer medium during the first pass of the transfer medium.

In various embodiments, a controller is provided for controlling an apparatus comprising a transfer medium to print an image onto a print medium and a multibeam device having a plurality of light beam sources, the controller being configured to receive inputs from a first and a second sensor and to determine, during a first pass of the transfer medium, a first time interval between when at least one light beam from the multibeam device is detected by the first sensor and when the top of the page is detected at a selected location of the transfer medium by the second sensor, said first pass to form a first color plane of a latent image on the transfer medium; and select, based at least in part on the determined first time interval, a first one of the plurality of light beam sources to begin illuminating the transfer medium to create the first color plane on the transfer medium during the first pass of the transfer medium.

In some embodiments, the controller may be further configured to, during the first pass, control the multi-beam device to form a first initial scan line of the first color plane at a first selected distance away from the location of the top of the page with the selected first one of the plurality of light beam sources, the first color plane having a plurality of scan lines including the first initial scan line, and the first initial scan line being nearest to the top of the page relative to the other scan lines of the first color plane. For these embodiments, the controller may also be configured to identify a cross scan from a plurality of cross scans, and to control the multi-beam device to form the first initial scan line of the first color plane during said identified cross scan.

In some embodiments, the controller may also be configured to determine, during a second pass of the transfer medium to form a second color plane on the transfer medium, a second time interval between when at least one light beam from the multi-beam device is detected by the first sensor and when the top of the page is detected at the selected location of the transfer medium the second sensor, and to select, based at least in part on the determined second time interval, a second one of the plurality of light beam sources to begin illuminating the transfer medium to create the second color plane on the transfer medium during the second pass of the transfer medium. For these embodiments, the controller may also be configured to control the multi-beam device to form a second initial scan line of the second color plane at a second selected distance away from the location of the top of the page with the selected second one of the plurality of light beam sources, the second color plane having a plurality of scan lines including the second initial scan line, and the second initial scan line being nearest to the top of the page relative to the other scan lines of the second color plane. For some embodiments, each of the first and second initial scan lines may have a first and a second width that are equal to a width of a pixel, and the second initial scan line may be disposed on the transfer medium such that the second initial scan line is not more than one pixel offset from first initial scan line.

In some embodiments, the controller may be configured to determine, during a third pass of the transfer medium to form a third color plane on the transfer medium, a third time interval between when at least one light beam from the multi-beam device is detected and when the top of the page is detected at the selected location of the transfer medium, and to select, based at least in part on the determined third time interval, a third one of the plurality of light beam sources to begin illuminating the transfer medium to create the third color plane on the transfer medium during the third pass of the transfer medium. For these embodiments, the controller may also be configured to control the multi-beam device to form a third initial scan line of the third color plane at a third selected distance away from the location of the top of the page with the selected third one of the plurality of light beam sources, the third color plane having a plurality of scan lines including the third initial scan line, and the third initial scan line being nearest to the top of the page relative to the other scan lines of the third color plane. For some embodiments, the third initial scan line may have a width that is equal to the width of the pixel, and the third initial scan line may be disposed on the transfer medium such that the third initial scan line is not more than one pixel offset from the first and second initial scan lines.

In some embodiments, the controller may be configured to determine, during a fourth pass of the transfer medium to form a fourth color plane on the transfer medium, a fourth time interval between when at least one light beam from the multi-beam device is detected and when the top of the page is detected at the selected location of the transfer medium, and to select, based at least in part on the determined fourth time interval, a second one of the plurality of light beam sources to begin illuminating the transfer medium to create the fourth color plane on the transfer medium during the fourth pass of the transfer medium. For these embodiments, the controller may also be configured to control the multi-beam device to form a fourth initial scan line for the fourth color plane at a fourth selected distance away from the location of the top of the page with the selected fourth one of the plurality of light beam sources, the fourth color plane having a plurality of scan lines including the fourth initial scan line, and the fourth initial scan line being nearest to the top of the page relative to the other scan lines of the fourth color plane. For some embodiments, the fourth initial scan line may have a width that is equal to the width of the pixel, and the fourth initial scan line may be disposed on the transfer medium such that the fourth initial scan line is not more than one pixel offset from the first, second, and third initial scan lines.

In some embodiments, the controller may be configured to determine a beam detection period based on inputs provided by the first sensor, a beam detection period being an amount of time between two successive detections of light beams from the same light beam source during two successive cross scans of the transfer medium, and to select the first one of the plurality of light beam sources by comparing the first time interval with the determined beam detection period. For these embodiments, the plurality of light beam sources may include N light beam sources where N is an integer, and the controller is further configured to select the first one of the plurality of light beam sources by dividing the beam detection period into N time increments and associate each time increment to a corresponding one of the plurality of light sources, and to determine that the first time interval is within a time increment associated with the first one of the plurality of light beam sources. In some embodiments, the N time increments are equivalent time increments. In some alternative embodiments, the controller may be configured to select the first one of the plurality of light beam sources by dividing the beam detection period into N+1 time increments and associate each time increment to a corresponding one of the plurality of light sources, and to determine that the first time interval is within a time increment associated with the first one of the plurality of light beam sources.

In some embodiments, the detection during the first pass of the at least one light beam from the multi-beam device and the detection of the top of the page at the selected location of the transfer medium occurs during a single cross scan of the transfer medium. In some embodiments, the plurality of light beam sources is laser diodes.

In some embodiments, an article of manufacture is provided that includes a storage medium, and a set of instructions stored in the storage medium, which, when executed by an apparatus, causes the apparatus to perform operations including determining, during a first pass of a transfer medium of a multi-beam printer, a first time interval between when at least one light beam from a multi-beam device is detected and when a top of a page is detected at a selected location of the transfer medium, the multi-beam device including a plurality of light beam sources, the first pass to form a first color plane of a latent image on the transfer medium, and selecting, based at least in part on the determined first time interval, a first one of the plurality of light beam sources to begin illuminating the transfer medium to create the first color plane on the transfer medium during the first pass of the transfer medium.

In some embodiments, the operations may further include, during the first pass, forming a first initial scan line of the first color plane at a first selected distance away from the location of the top of the page with the selected first one of the plurality of light beam sources, the first color plane having a plurality of scan lines including the first initial scan line, and the first initial scan line being nearest to the top of the page relative to the other scan lines of the first color plane. For these embodiments, the operations may also include identifying a cross scan from a plurality of cross scans, and forming the first initial scan line of the first color plane during said identified cross scan.

In some embodiments, the operations may include determining, during a second pass of the transfer medium to form a second color plane on the transfer medium, a second time interval between when at least one light beam from the multi-beam device is detected and when the top of the page is detected at the selected location of the transfer medium, and selecting, based at least in part on the determined second time interval, a second one of the plurality of light beam sources to begin illuminating the transfer medium to create the second color plane on the transfer medium during the second pass of the transfer medium. For these embodiments, the operations may also include forming a second initial scan line of the second color plane at a second selected distance away from the location of the top of the page with the selected second one of the plurality of light beam sources, wherein each of the first and second initial scan lines having a first and a second width that are equal to a width of a pixel, and the second initial scan line is disposed on the transfer medium such that the second initial scan line is not more than one pixel offset from first initial scan line, the second color plane having a plurality of scan lines including the second initial scan line, and the second initial scan line being nearest to the top of the page relative to the other scan lines of the second color plane.

In some embodiments, the operations may further include determining, during a third pass of the transfer medium to form a third color plane on the transfer medium, a third time interval between when at least one light beam from the multi-beam device is detected and when the top of the page is detected at the selected location of the transfer medium, and selecting, based at least in part on the determined third time interval, a third one of the plurality of light beam sources to begin illuminating the transfer medium to create the third color plane on the transfer medium during the third pass of the transfer medium. For these embodiments, the operations may also include forming a third initial scan line of the third color plane at a third selected distance away from the location of the top of the page with the selected third one of the plurality of light beam sources, the third initial scan line having a width that is equal to the width of the pixel, and the third initial scan line is disposed on the transfer medium such that the third initial scan line is not more than one pixel offset from the first and second initial scan lines, the third color plane having a plurality of scan lines including the third initial scan line, and the third initial scan line being nearest to the top of the page relative to the other scan lines of the third color plane.

In some embodiments, the operation may include determining, during a fourth pass of the transfer medium to form a fourth color plane on the transfer medium, a fourth time interval between when at least one light beam from the multi-beam device is detected and when the top of the page is detected at the selected location of the transfer medium, and selecting, based at least in part on the determined fourth time interval, a second one of the plurality of light beam sources to begin illuminating the transfer medium to create the fourth color plane on the transfer medium during the fourth pass of the transfer medium. For these embodiments, the operations may also include forming a fourth initial scan line of the fourth color plane at a fourth selected distance away from the location of the top of the page with the selected fourth one of the plurality of light beam sources, the fourth initial scan line having a width that is equal to the width of the pixel, and the fourth initial scan line is disposed on the transfer medium such that the fourth initial scan line is not more than one pixel offset from the first, second, and third initial scan lines, the fourth color plane having a plurality of scan lines including the fourth initial scan line, and the fourth initial scan line being nearest to the top of the page relative to the other scan lines of the fourth color plane.

These and other aspects of various embodiments of the present invention will now be described in greater detail below.

BRIEF DESCRIPTION OF THE DRAWINGS

The present invention will be described by way of exemplary embodiments, but not limitations, illustrated in the accompanying drawings in which like references denote similar elements, and in which:

FIGS. 6A and 6B illustrate the results of different passes of a transfer medium through an optical system of a multi-beam multi-pass printer, in accordance with various embodiments of the present invention; and FIGS. 7A and 7B illustrates the results of different passes of a transfer medium through an optical system of a multi-beam multi-pass printer and in which the beam detection (BD) period in these passes has been divided into n+1 time increments where n is the number of light beam sources, in accordance with various embodiments of the present invention.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

In the following description, certain terms may be repeatedly used in order to facilitate an understanding of various embodiments of the present invention. These terms include, for example, horizontal, vertical, up, down, across, top, and so forth, which are relative terms that depend on points of reference. Thus, these terms are used herein as a matter of convenience and for ease of illustration and should not be construed as limitations for the various embodiments to be described herein.

Embodiments of the present invention are directed to methods and apparatuses that allow a multi-beam multi-pass printer to print color images with little or no registration errors. In some embodiments, the apparatuses and methods may allow for alignment of multiple color planes of a latent image within plus or minus ½ pixels. In order to ensure such alignments, embodiments of the present invention provides for the initial scan lines of multiple color planes of the latent image to be substantially aligned with respect to each other as will be further described. The term "initial scan line" as will be used herein is in reference to the first scan line of a plurality of scan lines of a color plane that is first or initially formed on, for example, a transfer medium.

Figure 1A:
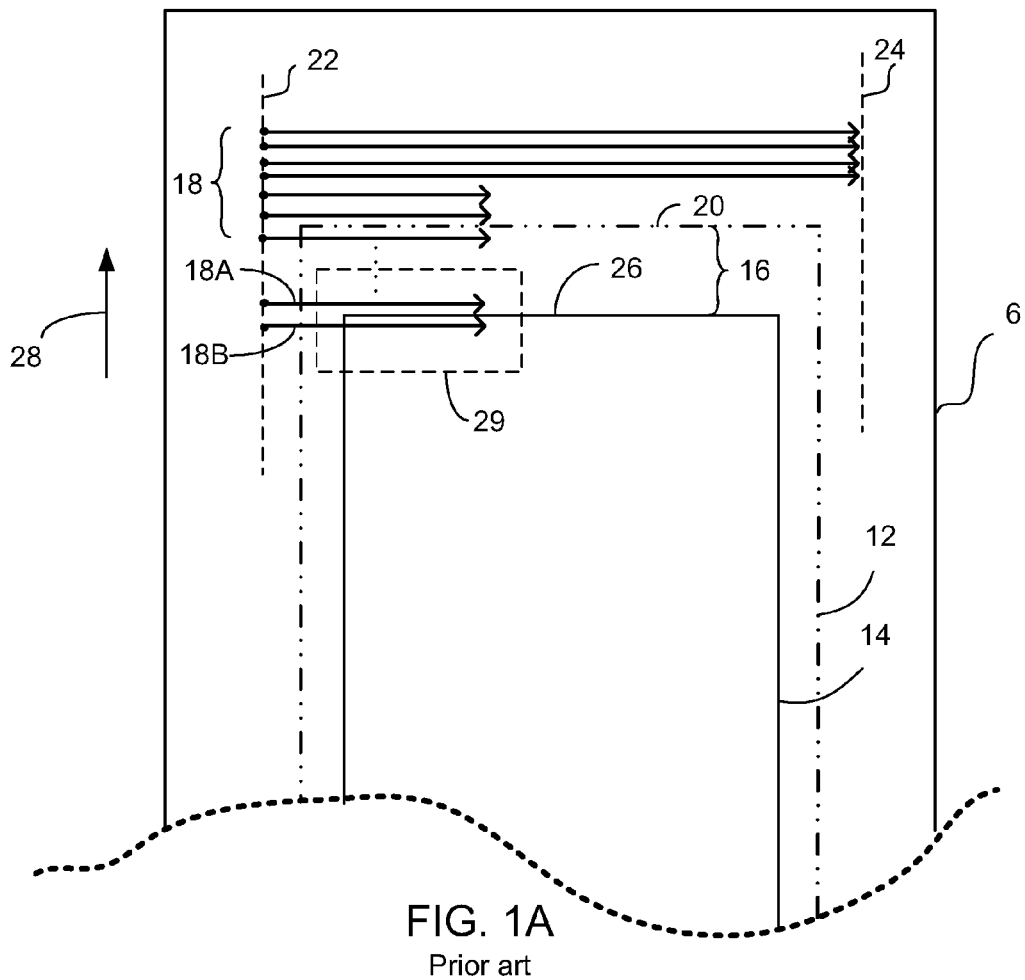
FIG. 1A illustrates a transfer medium being scanned by a one beam system using conventional techniques.

Turning to FIG. 1A, which depicts a portion of a surface of a transfer medium being scanned by a single beam color printer system that includes an optical system and employs conventional techniques in order to form a color plane of a latent image on the transfer medium. An outline 12 has been superimposed on the transfer medium 6 that corresponds to the outline of a print medium that the color image associated with the latent image will be printed on. For ease of illustration, outline 12 of the print medium may be referred to herein as a "page." In the following description, the top line of outline 12 will be referred to as top of page (TOP) 20, which is the designated location on the transfer medium that corresponds to the top of a print medium. More particularly, the TOP 20 will be the first border or portion of the page that will come into the field of view of the optical system.

Also superimposed on the transfer medium 6 is an outline 14 that represents the desired placement location of the color planes that make up the latent image. In this description, the top line of outline 14 will be referred to as top of image (TOI) 26, which is located a selected distance away from the TOP 20 and corresponds to the location where the initial scan line of the color plane (as well as the initial scan line of the other color planes) will preferably be placed. Another way to define the "initial scan line" of a color plane is that among all of the scan lines that make up a color plane it is the scan line that is nearest to the TOI 26.

In the relevant art, it is the general practice not to keep printing an image all the way to the edge of the print medium.

Thus, in this example, there is a margin space between the outline 14 of the image and the outline 12 of the print medium including a top margin 16. The top margin 16 will typically have sufficient space to accommodate many scan lines. For example, for 600 dots per inch (dpi) laser printers, the scan lines will be only 1/600 inch apart. Thus, many scan lines could possibly fit into the space occupied by the top margin 16. Note that FIG. 1A as well as the other subsequent figures to be presented and described herein are not drawn to scale, and were drawn for ease of illustration and explanation.

When a latent image is to be formed on the transfer medium 6, the transfer medium 6 may pass through the field of view of the optical system multiple times to create the different color planes that will make up the latent image. During each pass, the optical system may repeatedly cross scan 18 different sections of the transfer medium 6 between, for example, the incremental movements of the transfer medium 6 as it moves in the vertical direction 28. In this example, the cross scans 18 are horizontal cross scans of the transfer medium 6 at different times and between the incremental movements of the transfer medium 6 in the vertical direction 28.

The top first four cross scans 18 each represent the field of view of the optical system at different points in time as the transfer medium 6 is incrementally moved in direction 28. Each of the cross scans 18 will extend from a first side 22 of the transfer medium 6 to a second side 24 of the transfer medium 6 along a straight line. As depicted by cross scans 18, which begins well before outline 14 where the color plane is to be placed, the scanning of the transfer medium 6 by optical system may begin well before outline 14 reaches the field of view of the optical system.

Not all the cross scans 18 will result in data (i.e., in the form of electrostatic charge) being actually written onto transfer medium 6. For example, a single beam color printer system will typically include, as earlier described, an optical system that includes a light beam source and various optics. The printer's light beam source may at least be powered down to a very low power state, and the printer's optical system may be generating a very small amount or no light at all when the field of view of the optical system is above or below the outline 14 (i.e., where the color plane of the latent image is to be hopefully placed). That is, the printer's optical system may generate a light beam (with sufficient power to write on the transfer medium 6) only when the transfer medium 6 has been properly positioned (i.e., vertical alignment) with respect to the field of view of the optical system, and the printer's optical system has been properly aligned (i.e., horizontal alignment) to direct the light beam to the proper location on transfer medium 6 to form the scan lines. In this case, the desirable initial location for initially forming a color plane is TOI 26 where the initial scan line of the color plane as well as the initial scan lines of subsequent color lines will preferably be placed.

As the transfer medium 6 is incrementally moved in direction 28, the field of view of the printer's optical system will move down in the opposite direction from the direction 28 that the transfer medium 6 is moving. As a result, the field of view of the optical system will move nearer to outline 12 (representing the print medium or page) and outline 14, the location where the color plane for the latent image will be desirably placed. As the transfer medium 6 is incrementally moved in direction 28, the printer's optical system may be continuously scanning the transfer medium 6 as depicted by the multiple cross scans 18.

In conventional single beam multi-pass systems, the determination as to when to begin forming the initial scan line of a color plane is by counting the number of cross scans 18 that occur after the TOP 20 has been detected. For example, suppose that the space for the top margin 16 can accommodate a hundred cross scans (or 100 scan lines). The system logic may be designed to begin counting, after the TOP 20 has been detected, each of the subsequent cross scans 18. After counting a hundred cross scans 18, the initial scan line for the color plane may be formed during the $101^{st}$ cross scan 18.

Figure 1B:
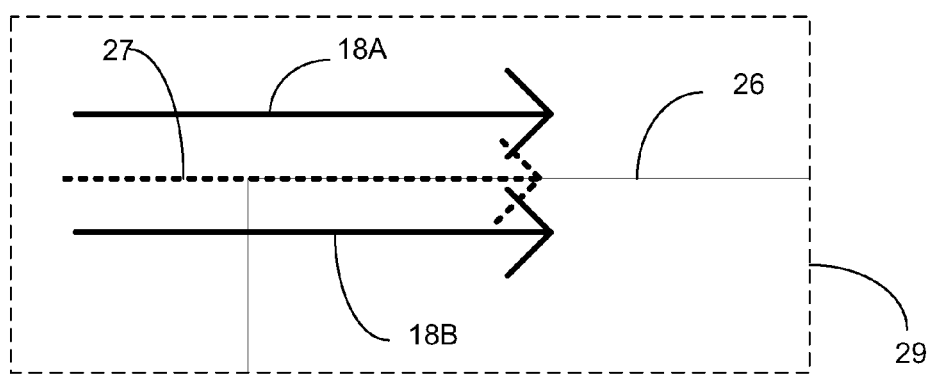
FIG. 1B illustrates a portion of the transfer medium of FIG. 1A in greater detail.

A more detailed view of a portion of FIG. 1A that is represented by rectangle 29 is illustrated in FIG. 1B. In order to assure alignment between different color planes of a latent image, it is usually desirable to place the initial scan lines of the color planes at the same location of the transfer medium 6, such as at the TOI 26. In order to form an initial scan line of a color plane directly on the TOI 26, such an initial scan line will need to be formed during a cross scan 27 that falls directly on top of the TOI 26. However, because of device limitations, and because of the asynchronous nature of such devices, it is usually not possible to have a cross scan, such as cross scan 18A and 18B, that will fall directly on top of the TOI 26. Fortunately, with prior art one-beam systems, as is the case here, so long as the counting of the cross scans is done properly and the actual scan line is formed during the proper cross scan (e.g., cross scan 18A or 18B), the actual initial scan line formed will not be more than half pixel away from the TOI 26 (note that since a scan line corresponds to a row of image pixels, it will have a height or thickness of one pixel).

Furthermore, because these printer systems are asynchronous systems, the initial scan lines of subsequent color planes to be formed will, in all likelihood, not end up being formed directly on top of the initial scan lines of preceding color planes. Again, however, so long as the counting of the cross scans are done properly this should not be a problem in single beam systems since all of the initial scan lines should be within half pixel of the TOI 26. In other words, and assuming that the proper counting of the cross scans were properly performed, the initial scan lines for the subsequent color planes to be formed will be at cross scan 18A or 18B or closer to TOI 26.

As can be seen in FIGS. 1A and 1B, the initial scan line of a color plane will determine the placement of all subsequent scan lines of the color plane as all of the subsequent scan lines will follow the initial scan line. So long as each of the initial scan lines of the color planes are substantially aligned with respect to each other, as the above described single beam multi-pass system is able to do, the resulting latent image will have minimal registration error. Unfortunately, applying only the above technique for determining where to place the initial scan lines of color planes of a latent image (i.e., counting the scan lines or cross scans between TOP 20 and TOI 26) to a multi-pass multi-beam system may result in significantly greater registration errors as will be described herein.

Figure 2:
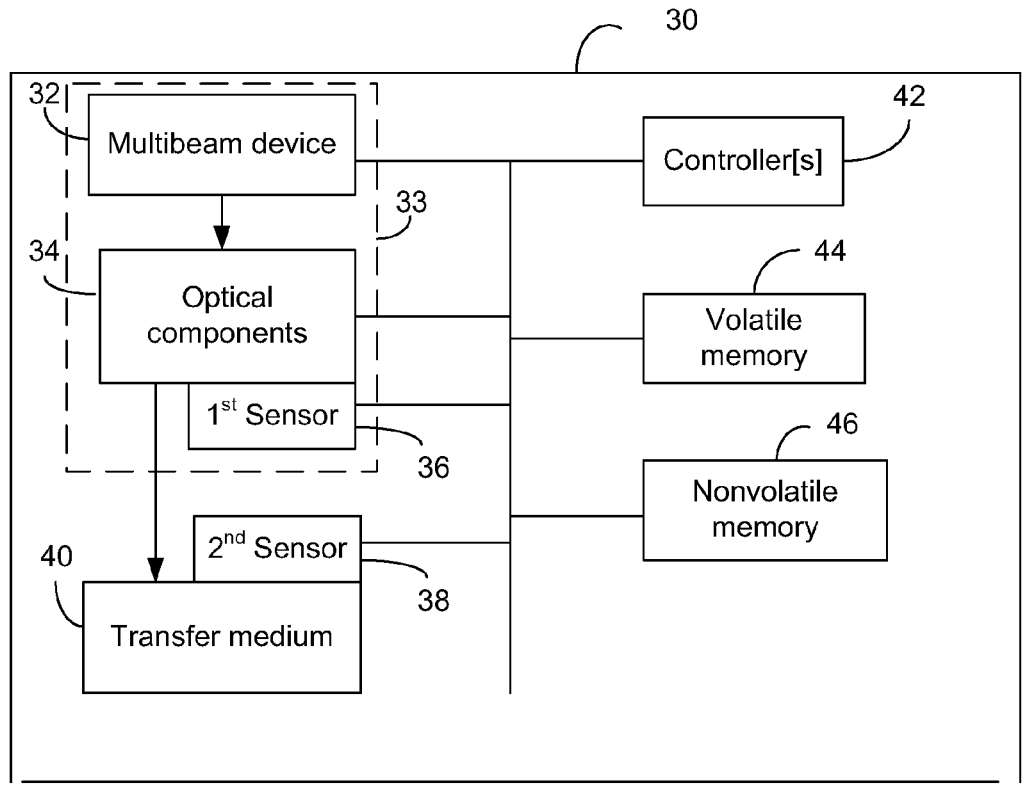
FIG. 2 illustrates a block diagram of selective components of a multi-beam multi-pass printer, in accordance with various embodiments of the present invention.

Although the following description of various embodiments is directed to a four-beam multi-pass printer system, those of ordinary skill in the art will recognize that the various embodiments of the present invention to be described herein may be applied to other multi-beam multi-pass printer systems such as a two-beam printer system, a three-beam printer system, a six-beam printer system, an eight-beam printer system, and so forth. Referring now to FIG. 2, which is a block diagram of some of the components of a multi-beam multi-pass printer in accordance with various embodiments of the present invention. The multi-beam multi-pass printer 30, which may be a color laser printer, includes a multi-beam device 32 having a plurality of light beam sources, optical components 34 including one or more mirrors for directing one or more light beams outputted by the multi-beam device 32, a first sensor 36 for beam detection, a second sensor 38, which may be a top of page (TOP) sensor, a transfer medium 40, one or more controllers 42, a volatile memory 44, and a nonvolatile memory 46. Although not depicted, the multi-beam multi-pass printer 30 may include additional components such as fusers, toner cartridges, mechanical components, interfaces, various drivers, and so forth.

The one or more controllers 42 may be in the form of one or more processors and/or microcontrollers designed to execute computer readable programming instructions stored in the volatile memory 44 and/or nonvolatile memory 46. The volatile memory 44 and/or the nonvolatile memory 46 may store image data and/or programming instructions for executing the various functions to be described herein. In some embodiments, such instructions may be embodied in firmware. Based on the programming instructions, and the inputs provided by the first and the second sensors 36 and 38, the one or more controllers 42 may control the multi-beam device 32 to perform the various operations to be described herein.

The multi-beam device 32 includes at least two light beam sources, which in some embodiments, may be laser diodes. The optical components 34 may be employed to direct the light beams outputted by the multi-beam device 32 onto the transfer medium 40. The first sensor 36 may be one or more beam detectors in the form of one or more optical sensors that may be disposed along one or more light paths of the light beams generated by the multi-beam device 32. Such beam detectors are known in the art and are typically used for, for example, horizontal synchronization. In some embodiments, the multi-beam device 32, the optical components 34, and the first sensor 36 may comprise an optical system 33. The second sensor 38, as previously indicated, may be a TOP sensor for detecting a top of a page, and more particularly, for detecting a designated location on the transfer medium 40 that corresponds to the top of a print medium or page. The transfer medium 40, in some embodiments, may be an electrosensitve drum or transfer belt.

Figure 3:
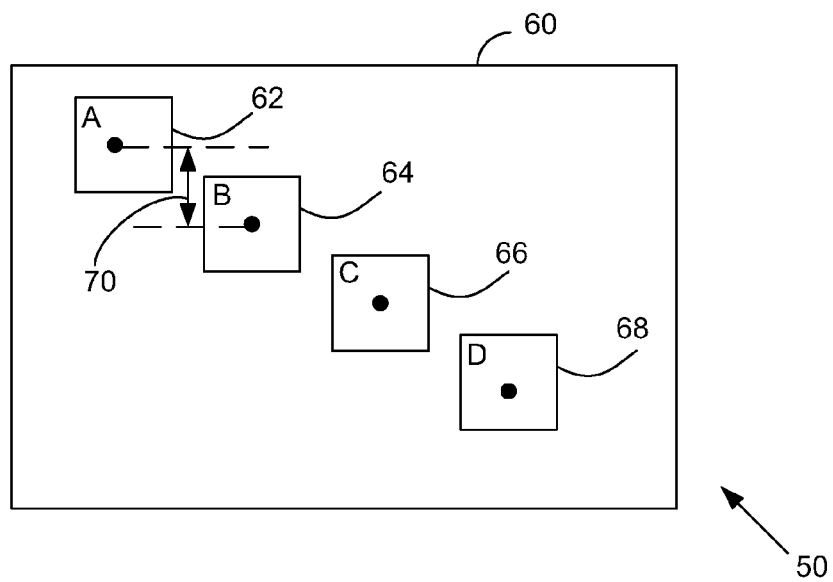
FIG. 3 illustrates a package including multiple light beam sources, in accordance with various embodiments of the present invention.

FIG. 3 depicts a top down view of a package 50 that may be included with the multi-beam device 32 of FIG. 2 in accordance with various embodiments of the present invention. The package 50 includes a substrate 60, such as a circuit board, and four light beam sources 62, 64, 66, and 68. In some embodiments, the four light beam sources 62, 64, 66, and 68 may be laser diodes. At the center of each light beam source 62, 64, 66, and 68 are black dots that represent the points from where light beams will project. Note that the light beam sources 62, 64, 66, and 68 are disposed on the substrate 60 in a staggered manner. This is to ensure that the light beams that will be generated by the light beam sources 62, 64, 66, and 68 will not be too far apart. That is, the vertical distance 70 between the black dots (i.e., where the light beams will project from) may be reduced so that the scan lines formed by the light beam sources 62, 64, 66, and 68 are close together. This is a well-known feature of multi-beam devices, and therefore, will not be further elaborated. For ease of illustration in the following discussion the light beam sources 62, 64, 66, and 68 may be referred to as light beam sources A, B, C, and D, and the light beams outputted by these light beam sources 62, 64, 66, and 68 may be referred to as beams A, B, C, and D, respectively.

Figure 4:
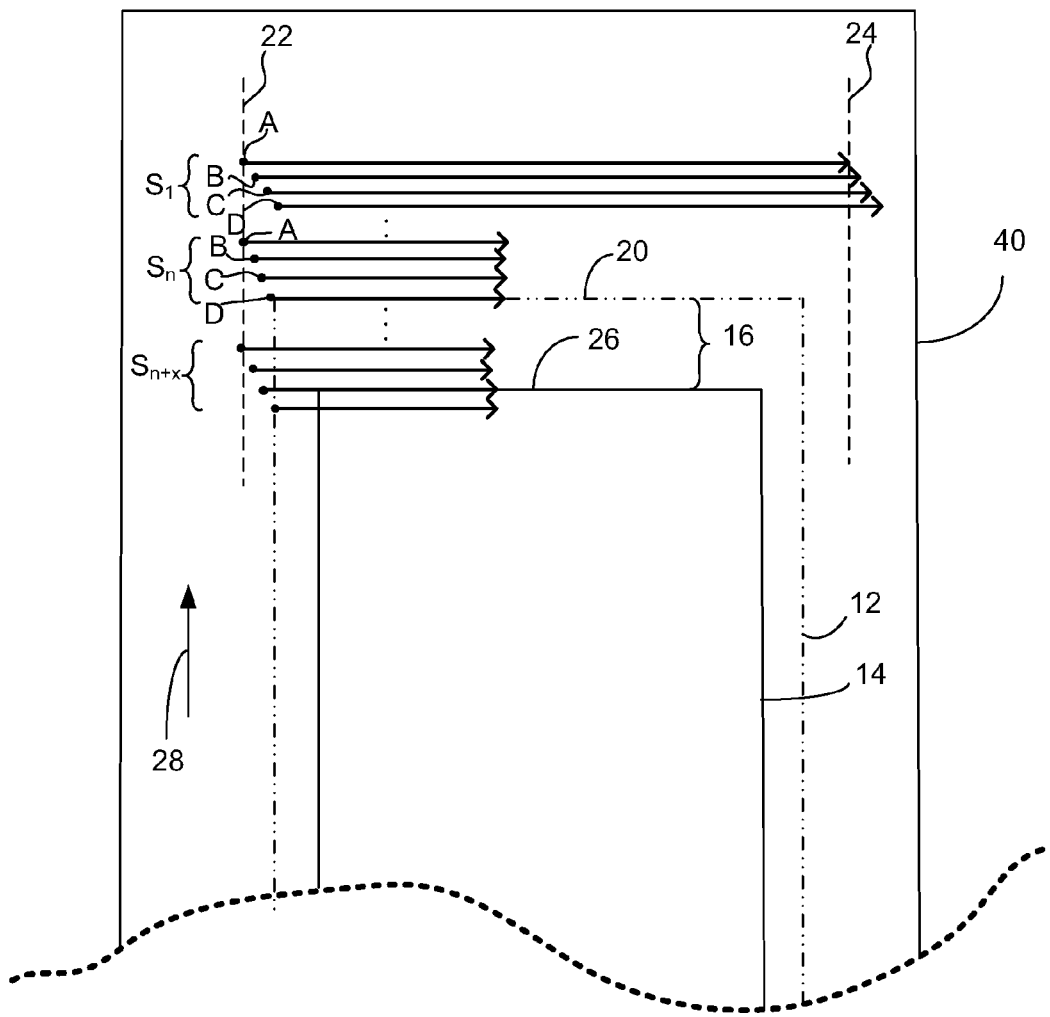
FIG. 4 illustrates a portion of the transfer medium of FIG. 2 being scanned, in accordance with various embodiments of the present invention.

FIG. 4 depicts a portion of the surface of the transfer medium 40 of FIG. 2 being scanned by the optical system 33 during one exemplary pass of the transfer medium 40 in order to form a color plane on the transfer medium 40, in accordance with various embodiments of the present invention. As in FIG. 1A, in order to illustrate aspects of various embodiments of the present invention, an outline 12 has been superimposed on top of the transfer medium 40 that corresponds to the outline of a print medium on which a color image will be printed. For ease of illustration, outline 12 of the print medium may be referred to as a "page." The top line of outline 12 will again be referred to as a top of page (TOP) 20.

Also superimposed on the transfer medium 40 is an outline 14 that represents the desired placement location of the color planes that make up a latent image. In this description, the top line of outline 14 will be referred to as top of image (TOI) 26, which corresponds to the location where the initial scan line of the color plane (as well as the initial scan lines of the other color planes) will preferably be placed.

When a latent image is to be formed on the transfer medium 40, the transfer medium 40 may pass through the field of view of the optical system 33 multiple times to create the different color planes that will make up the latent image, similar to the previously described techniques. Similar to the scanning of a transfer medium 6 by the single beam system depicted in FIG. 1A, during each pass, the optical system 33 may repeatedly cross scan different sections of the transfer medium 40. However, unlike the single beam system, in this case, each cross scan S* ("*" indicating wild card) will comprise multiple beam scans associated with each of the individual beam light sources 62, 64, 66, and 68.

For example, in FIG. 4, $S_1$ represents a first cross scan that comprises four individual beam scans (A, B, C, and D). Note that the starting points of the beam scans A, B, C, and D at the first side 22 of the transfer medium 40 are staggered to reflect the staggered arrangement of the beam light sources 62, 64, 66, and 68. Each time a cross scan S* is performed, the optical system 33 may sweep across the transfer medium 40 from the first side 22 to the second side 24 with four individual beam scans A, B, C, and D. During all of the cross scans (S*) that occur before the TOI 26 comes into the field of view of the optical system 33, the light beam sources 62, 64, 66, and 68 may be powered down to prevent writing on the transfer medium 40, but they may still be supplied with sufficient minimal power to output low intensity but detectable beams, or they may be completely turned off. Each time a new scan (S*) is to begin at the first side 22, one or more of the light beam sources 62, 64, 66, and 68 may be powered back up.

During the $n^{th}$ scan ($S_n$), the TOP 20 may be detected by the second sensor 38. However, using only the conventional counting approach described previously for determining which cross scan is to be used to form the initial scan line of a color plane may result in significant misalignment of color planes. This is due to the fact that the prior art counting approach only identifies which cross scan should be used in forming the initial scan line but does not indicate which of the specific beam scans (e.g., beam scans A, B, C, or D) of the identified cross scan should be used in order to form the initial scan line of a color plane. As a result, the prior art counting approach may result in misalignment of as much as 3 or 4 pixels between the different color planes formed during different passes of the transfer medium 40. As a result of this relative large registration error, the resulting color image may be significantly distorted. In the following description, the cross scan during which the TOP 20 is detected will be represented by $S_n$, while the cross scan during which the initial scan line will be formed will be represented by $S_{n+x}$, where n and x are integers.

Figure 5:
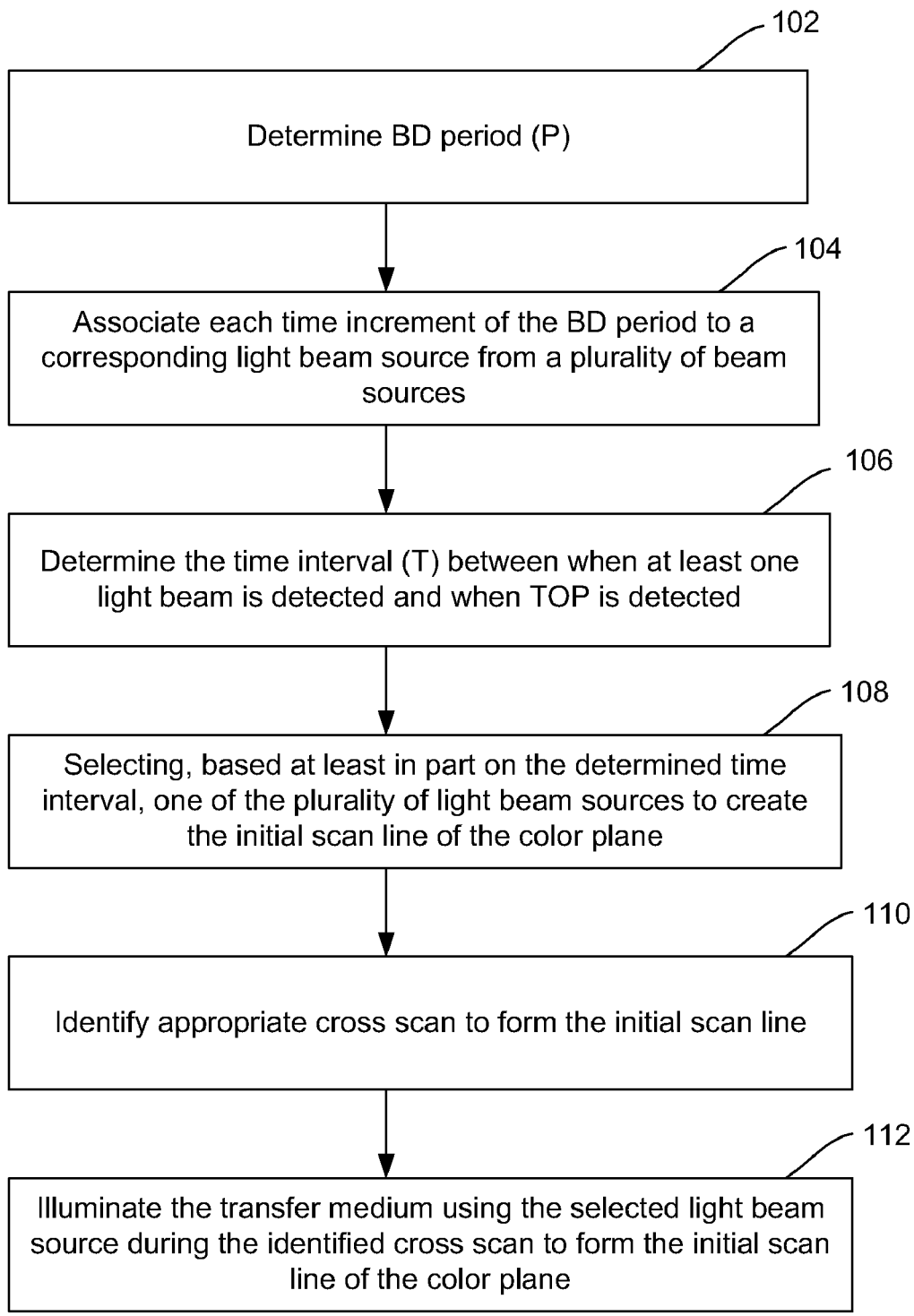
FIG. 5 illustrates a flow chart of a process, in accordance with various embodiments of the present invention.

According to various embodiments of the present invention, methods and apparatuses are provided that facilitate alignment of color planes in a multi-beam multi-pass printer. In some embodiments, color planes of a latent image may be aligned to within plus or minus half a pixel (+/−½ pixels) of ideal. More particularly, since each plane may be within +/−½ pixel of ideal, there may be registration errors of up to 1 pixel between color planes: one plane at +½ pixel and another at −½ pixel. Each plane is still within ½ pixels. Thus, each plane will be within +/−½ pixel of ideal, but not aligned to each other within +/−½ pixels. Turning to FIG. 5, a flowchart of a process for forming an initial scan line of a color plane of a latent image using a multi-beam multi-pass printer is depicted, in accordance with various embodiments of the present invention. The process 100 may be repeated multiple times in order to create each of the initial scan line of color planes that make up a latent image. Using the process 100, each of the color planes formed may be substantially aligned with the other color planes with a registration error of not more than +/−½ pixels. In some embodiments, the process 100 may be practiced using the multi-beam multi-pass printer 30 of FIG. 2.

The process 100 may begin when a beam detection (BD) period (P) is determined at block 102. The BD period is the time period between two successive detections of the same light beam from the multi-beam device 32. For example, in FIG. 4, the BD period may be the start of the $(n+x)^{th}$ cross scan $(S_{n+x})$ and the start of the next cross scan, the $(n+x+1)^{th}$ cross scan $(S_{n+x+1})$. Since it is expected that such a time interval would be relatively constant, in some embodiments, the BD period may already have been predetermined in which case, block 102 may be omitted. In various embodiments, the BD period may be segmented into different time increments. More particularly, the BD period may be segmented into n time increments, where n is the number of light beam sources included in the multi-beam multi-pass printer. For example, for the multi-beam printer 30 of FIG. 2 having the four light beam sources 62, 64, 66, and 68, the BD period may be divided into four equal time increments. Each of the time increments of BD period may be associated with a corresponding light beam source from the plurality of light sources included in the multi-beam multi-pass printer at block 104. Note that as will be further described below, in some alternative embodiments, the BD period may be divided into n+1 time increments. For these embodiments, at least two of the time increments may be associated with a common light beam source.

A determination may be made as the time interval (T) between when at least one light beam is detected from the plurality of light beam sources of the multi-beam multi-pass printer, and when a top of a page (TOP) of the transfer medium is detected during the cross scan $(S_n)$ at block 106. For example, in FIG. 4 at least one light beam from the plurality of light beam sources 62, 64, 66, and 68 may be detected by the first sensor 36 when the $n^{th}$ cross scan $(S_n)$ begins at first side 22, and the TOP 20 may be detected when the second sensor 38 detects the TOP 20 during the same cross scan $(S_n)$. After determining the time interval (T), one of the plurality light beam sources 62, 64, 66, and 68 may be selected based, at least in part, on the determined time interval (T) to create the initial scan line of the color plane during cross scan $(S_{n+x})$ at block 108. This may be accomplished by associating the time interval (T) to one of the time increments of the BD period. For example, a 1 m sec (milli second) BD period may be divided into four equal time increments, with the first time increment (0 to 0.25 m sec) being associated with light beam source A, the second time increment (0.26 to 0.50 m sec) being associated with light beam source B, the third time increment (0.51 to 0.75 m sec) being associated with light beam source C, and the third time increment (0.76 to 1.0 m sec) being associated with light beam source D. Suppose further that the time interval (T) was determined to be 0.60 m sec, then the time interval (T) would be associated with light beam source C. As a result, light beam source C would be selected to create the initial scan line of the color plane during cross scan $(S_{n+x})$.

An appropriate cross scan $(S_{n+x})$ may be identified for forming the initial scan line at block 110. The appropriate cross scan $(S_{n+x})$ to form the initial scan line may be identified using, for example, the cross scan counting technique previously described. Once the proper cross scan $(S_{n+x})$ has been identified, the transfer medium 40 may be illuminated using the selected light beam during the properly identified cross scan $(S_{n+x})$ to form the initial scan line of the color plane at block 112. In order to assure that the proper light beam source (e.g., light beam source C in the above example) is used for creating the initial scan line during the selected cross scan (i.e., $S_{n+x}$), the first row of image data may be assigned to light beam source C, the second row of image data would be assigned to light beam source D, the third row of image data assigned to light beam source A (in the next cross scan—$S_{n+x+1}$), and the fourth row of image data assigned to light beam source B (in the next cross scan—$S_{n+x+1}$), and so forth. One way to accomplish this may be to add additional line or lines to the top margin 16, for example, having 100 lines for the top margin 16 for light beam sources C and D, and having 101 lines for the top margin 16 for light beam sources A and B. The extra top margin is so that the first image data to be printed using light beam sources A and B would occur only after image data was printed for light beam sources C and D.

Alternatively, a line of blank data may be added. For example, if light beam source B is selected to create the initial scan line of a color plane during the selected cross scan $(S_{n+x})$, then a line of blank data for light beam source A may be added that would prevent light beam source A from writing on the transfer medium during the selected cross scan $(S_{n+x})$. This may be accomplished in some embodiments by employing, for example, an application specific integrated circuit (ASIC) that is configured to provide one or more lines of blank data.

In various embodiments, the process 100 may be repeated for each initial scan line of each color plane that will make up a latent image. Note that, unless indicated otherwise, the blocks 102, 104, 106, 108, 110, and 112 depicted in FIG. 5 are not required to be performed in any specific sequential order. For example block 106 may occur before block 104 in various alternative embodiments. Further, one or more of the blocks may be omitted in alternative embodiments while in other alternative or the same embodiments, additional one or more blocks may be added.

Figure 6B:
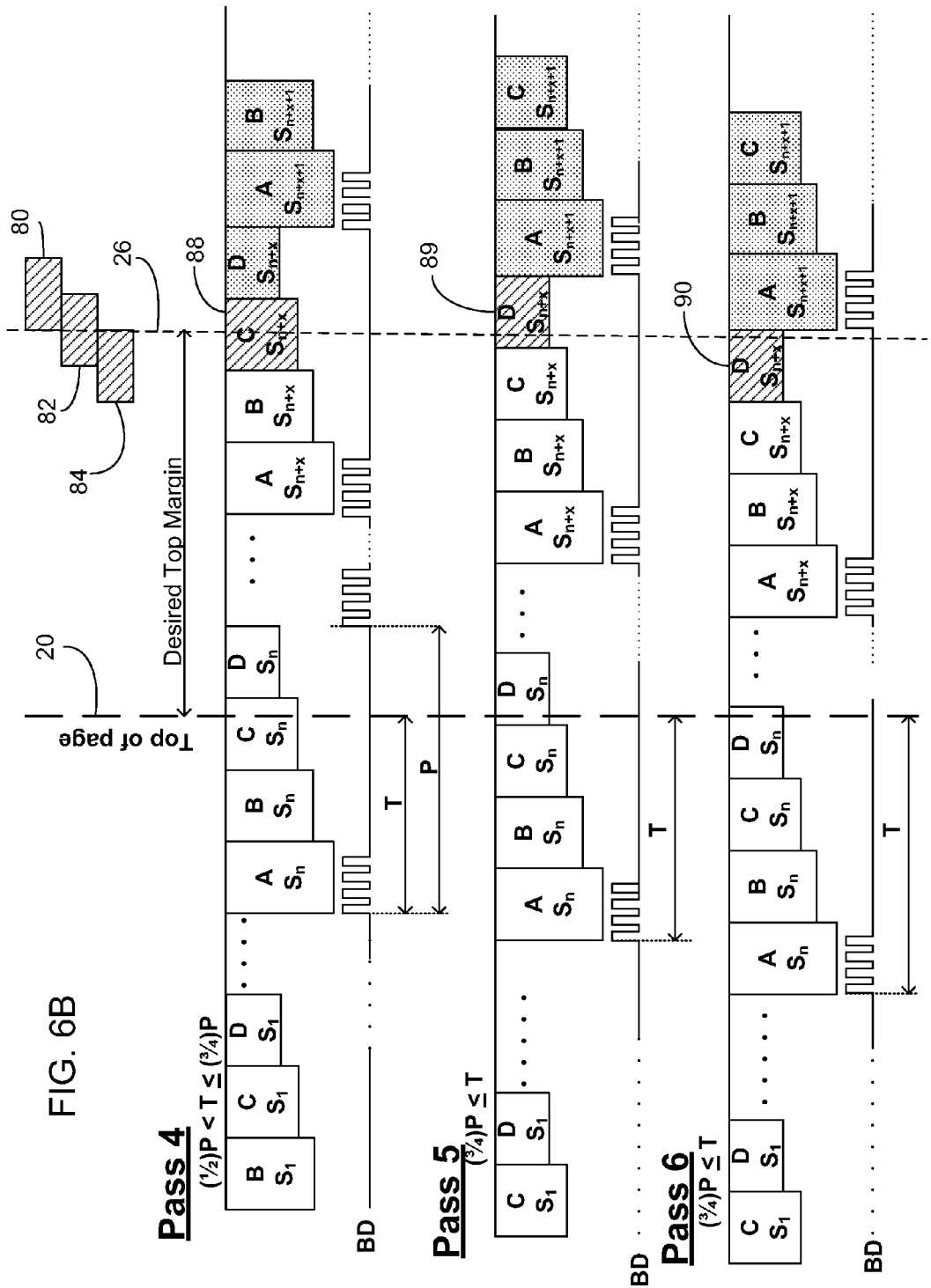

Turning now to FIGS. 6A and 6B, which illustrate the results of different passes of a transfer medium through an optical system of a multi-beam multi-pass printer in which each of the passes is associated with a different time interval (T), in accordance with various embodiments. In some embodiments, the multi-beam multi-pass printer may be the multi-beam multi-pass printer 30 of FIG. 2. FIGS. 6A and 6B more particularly depict examples of what happens during different passes of the transfer medium through the optical system when each pass is associated with a different time interval (T) and the BD period (P) has been divided into n equal time increments, where n is the number of light beam sources. Recall that the time interval (T) is the interval of time between when at least one beam is detected from at least one of the light beam sources and when the top of a page (TOP) is detected, the detection of the beam and the detection of the TOP occurring during the same cross scan $(S_n)$.

Each of the blocks depicted in FIGS. 6A and 6B represents a light beam source (A, B, C, or D) or their corresponding light beams during a pass of the transfer medium through the optical system of a multi-beam multi-pass printer with the exception of blocks 80, 82, and 84. Block 82 represents the desirable placement location of the initial scan line with respect to the TOI 26, while blocks 80 and 84 represent the resulting locations of the initial scan line with a maximum misalignment of ½ pixel, in accordance with various embodiments of the present invention. The blocks for light beam sources A, B, C, and D, also correspond to where the beams associated with the light beam sources A, B, C, and D will be located with respect to, for example, the TOP 20 and the TOI 26.

With respect to the blocks representing light beam source A, B, C, and D, the unfilled blocks indicate that the light beam sources represented by those blocks are not powered. The blocks filled with the slanted lines (e.g., refs. 85, 86, and 87) indicate, among other things, that those light beam sources represented by those blocks are the light beam sources selected to create an initial scan line of a color plane for their respective passes during the appropriate cross scan ($S_{n+x}$). The blocks filled with dots to the right of the blocks filled with the slanted lines represent the light beam sources that have been powered to output light beams for creating the scan lines that follow the initial scan line.

Depicted in FIGS. 6A and 6B is a line representing the top of page (TOP) 20. The line for TOP 20 also represents when the second sensor 38 has detected the TOP 20. FIGS. 6A and 6B further depict, just below the light beam source blocks, lines (designated on the left side as "BD") that indicate when beams from the light beam sources A, B, C, and D are detected using the first sensor 36, and how the time interval (T) and the BD period (P) is associated with each pass. Note that in FIGS. 6A and 6B whenever beams are detected, four "blips" are shown, which represent the detections of four low power beams from the four light beam sources A, B, C, and D.

Six passes of the transfer medium are depicted in FIGS. 6A and 6B, each having a different time interval (T). For these passes, the BD period (P) has been divided into four time increments that are each associated with a corresponding one of the light beam sources A, B, C, and D. For each of the passes, the time interval (T) is determined from the $n^{th}$ cross scan ($S_n$), while the initial scan line is formed during the $(n+x)^{th}$ cross scan ($S_{n+x}$).

In pass 1, the initial scan line is close to position 80 and the time interval (T) is determined to be less than ¼ P. As a result light beam source A is selected in order to create the initial scan line for a color plane during the $(n+x)^{th}$ cross scan ($S_{n+x}$) as indicated by ref. 85. The initial scan line (as represented by ref. 85) that will be formed will actually be earlier than the TOI 26. Note that in FIGS. 6A and 6B, although BP period (P) appears to be the time interval between the detection of the first beam (e.g., the first blip among the four blips) during a first cross scan (e.g., $S_1$), and the detection of the first beam during a second subsequent cross scan (e.g., $S_2$), in alternative embodiments, the BP period (P) may be based on the detection of the second, third, or fourth beams (i.e., the second, third or fourth blips) of two successive cross scans.

In pass 2, the initial scan line is close to position 84 and the time interval (T) is determined to be greater than the time interval (T) during pass 1 but still less than ¼ P. As a result, light beam source A will still be used in order to create the initial scan line during the $(n+x)^{th}$ cross scan ($S_{n+x}$) as indicated by ref. 86. However, note that the resulting initial scan line as represented by ref. 86 will move forward with respect to the initial scan line of pass 1 and the TOI 26. Note that while in this example, pass 1 and pass 2 are illustrated near the two extremes in the first two pass, both are within ½ a scan line from ideal.

In pass 3, the time interval (T) is determined to be greater than ¼ P, but less than or equal to ½ P. As a result, light beam source B will be used in order to create the initial scan line during the $(n+x)^{th}$ cross scan ($S_{n+x}$) as indicated by ref. 87. The resulting initial scan line as represented by ref. 87 will move backwards with respect to the initial scan line of pass 2 and is almost centered at TOI 26. During the $(n+x)^{th}$ cross scan ($S_{n+x}$) of this pass, light beam source A will continue to be powered down, and will only be powered up to begin creating scan lines during the succeeding cross scan ($S_{n+x+1}$).

In pass 4 depicted in FIG. 6B, the time interval (T) is determined to be greater than ½ P, but less than or equal to ¾ P. As a result, light beam source C will be used in order to create the initial scan line during the $(n+x)^{th}$ cross scan ($S_{n+x}$) as indicated by ref. 88. The resulting initial scan line as represented by ref. 88 will again shift with respect to the TOI 26. During the $(n+x)^{th}$ cross scan ($S_{n+x}$) of this pass, both light beam sources A and B will continue to be powered down, and will only be powered up to begin creating scan lines during the succeeding cross scan ($S_{n+x+1}$).

In pass 5, the time interval (T) is determined to be slightly greater or equal to ¾ P. As a result, light beam source D will be used in order to create the initial scan line during the $(n+x)^{th}$ cross scan ($S_{n+x}$) as indicated by ref. 89. The resulting initial scan line as represented by ref. 89 will again shift with respect to the TOI 26. During the $(n+x)^{th}$ cross scan ($S_{n+x}$) of this pass, light beam sources A, B, and C will continue to be powered down, and will only be powered up to begin creating scan lines during the succeeding cross scan ($S_{n+x+1}$).

In pass 6, the time interval (T) is determined to be much greater than ¾ P. As a result, light beam source D will be used in order to create the initial scan line during the $(n+x)^{th}$ cross scan ($S_{n+x}$) as indicated by ref. 90. The resulting initial scan line as represented by ref. 90 will again shift with respect to the TOI 26, in this case, forward of the initial scan line of pass 5. During the $(n+x)^{th}$ cross scan ($S_{n+x}$) of this pass, light beam sources A, B, and C will continue to be powered down, and will only be powered up to begin creating scan lines during the succeeding cross scan ($S_{n+x+1}$).

Thus, FIGS. 6A and 6B show that by employing the techniques described above, a multi-beam multi-pass printer may form multiple initial scan lines for multiple color planes on a transfer medium that are each placed very close to the ideal or desirable initial scan location and not greater than ½ pixel away from the ideal initial scan line location. That is, in the passes depicted, all of the resulting initial scan lines from the passes as represented by references 85, 86, 87, 88, 89, and 90 are at most, ½ pixels away from the TOI 26 and from the desirable location for the initial scan lines.

FIGS. 7A and 7B are similar to FIGS. 6A and 6B and illustrate the results of different passes of a transfer medium through a transfer medium of a multi-beam multi-pass printer in which each of the passes is associated with a different time interval (T). However, unlike the previous example, the BD period in these passes has been divided into n+1 time increments rather than the n time increments of the previous example. Again, n represents the number of light beam sources of the multi-beam multi-pass printer. In some embodiments, the division of the BD period into n+1 rather than "n" may allow for the shifting of the desirable initial scan location centered at the TOI 26 to an adjacent location as depicted by block 82 in FIGS. 7A and 7B. Note that block 82 has been shifted to the right of TOI 26 as compared to the location of block 82 in FIGS. 6A and 6B.

In order to divide the BD period into n+1 time increments, in some embodiments the BD period may initially be divided into n equal sized increments, and one of the increments may be split into two equal sub increments. Thus, in the example passes depicted in FIGS. 7A and 7B, the five time increments are: (1) less than or equal to (⅛)P; (2) greater than (⅛)P but less than or equal to (⅜)P; (3) greater than (⅜)P but less than or equal to (⅝)P; (4) greater than (⅝)P but less than or equal to (⅞)P; and (5) greater than (⅞)P. For each of the passes 1, 2, 3, 4, and 5 depicted in FIGS. 7A and 7B, the initial scan line will be created by light beam sources associated with blocks 91, 92, 93, 94, and 95, respectively. One interesting observation that can be made with respect to the passes depicted is that in pass 2 and 5, although the TOI 26 may fall on a specific block associated with a specific light beam source, a subsequent block (and the associated light beam source) is selected for forming the initial scan line. For example, in pass 2, the TOI 26 actually falls on block A during the $(n+x)^{th}$ cross scan $(S_{n+x})$. However, the subsequent block, block B, for the $(n+x)^{th}$ cross scan $(S_{n+x})$ is selected for creating the initial scan line. This is part in due to the fact that the ideal location of the initial scan line is after the TOI 26 as depicted by block 82. Similarly, in pass 5, TOI 26 falls on block D of the $(n+x)^{th}$ cross scan $(S_{n+x})$, but the subsequent block, block A, of the $(n+x+1)^{th}$ cross scan $(S_{n+x+1})$ is actually selected for the creation of the initial scan line.

Although specific embodiments have been illustrated and described herein, it will be appreciated by those of ordinary skill in the art and others, that a wide variety of alternate and/or equivalent implementations may be substituted for the specific embodiments shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method for operating a multi-beam printer, the multi-beam printer having a multi-beam device including a plurality of light beam sources, the method comprising:
    determining, during a first pass of a transfer medium, a first time interval between when at least one light beam is detected and when a top of a page is detected at a selected location of the transfer medium, said first pass to form a first color plane of a latent image on the transfer medium; and
    selecting, based at least in part on said determined first time interval, a first one of the plurality of light beam sources to begin illuminating the transfer medium to create the first color plane on the transfer medium during the first pass of the transfer medium.

2. The method of claim 1, further comprising forming a first initial scan line of the first color plane at a first selected distance away from the location of the top of the page with the selected first one of the plurality of light beam sources, the first color plane having a plurality of scan lines including the first initial scan line, and the first initial scan line being nearest to the top of the page relative to the other scan lines of the first color plane.

3. The method of claim 2, further comprising:
    identifying a cross scan from a plurality of cross scans; and
    forming the first initial scan line during said identified cross scan.

4. The method of claim 2, further comprising:
    determining, during a second pass of the transfer medium to form a second color plane on the transfer medium, a second time interval between when at least one light beam from the multi-beam device is detected and when the top of the page is detected at the selected location of the transfer medium; and
    selecting, based at least in part on said determined second time interval, a second one of the plurality of light beam sources to begin illuminating the transfer medium to create the second color plane on the transfer medium during the second pass of the transfer medium.

5. The method of claim 4, further comprising forming a second initial scan line of the second color plane at a second selected distance away from the location of the top of the page with the selected second one of the plurality of light beam sources, the second color plane having a plurality of scan lines including the second initial scan line, and the second initial scan line being nearest to the top of the page relative to the other scan lines of the second color plane.

6. The method of claim 5, wherein each of the first initial scan line and the second initial scan line respectively has a first width and a second width, wherein each of the first width and the second width is equal to a width of a pixel, and wherein the second initial scan line is disposed on the transfer medium such that the second initial scan line is not more than one pixel offset from the first initial scan line.

7. The method of claim 5, further comprising:
    determining, during a third pass of the transfer medium to form a third color plane on the transfer medium, a third time interval between when at least one light beam from the multi-beam device is detected and when the top of the page is detected at the selected location of the transfer medium; and
    selecting, based at least in part on said determined third time interval, a third one of the plurality of light beam sources to begin illuminating the transfer medium to create the third color plane on the transfer medium during the third pass of the transfer medium.

8. The method of claim 7, further comprising forming a third initial scan line of the third color plane at a third selected distance away from the location of the top of the page with the selected third one of the plurality of light beam sources, the third color plane having a plurality of scan lines including the third initial scan line, and the third initial scan line being nearest to the top of the page relative to the other scan lines of the third color plane.

9. The method of claim 8, wherein the third initial scan line has a width that is equal to the width of the pixel, and wherein the third initial scan line is disposed on the transfer medium such that the third initial scan line is not more than one pixel offset from the first and second initial scan lines.

10. The method of claim 8, further comprising:
    determining, during a fourth pass of the transfer medium to form a fourth color plane on the transfer medium, a fourth time interval between when at least one light beam from the multi-beam device is detected and when the top of the page is detected at the selected location of the transfer medium; and
    selecting, based at least in part on said determined fourth time interval, a second one of the plurality of light beam sources to begin illuminating the transfer medium to create the fourth color plane on the transfer medium during the fourth pass of the transfer medium.

11. The method of claim 10, further comprising forming a fourth initial scan line of the fourth color plane at a fourth selected distance away from the location of the top of the page with the selected fourth one of the plurality of light beam sources, the fourth color plane having a plurality of scan lines including the fourth initial scan line, and the fourth initial scan line being nearest to the top of the page relative to the other scan lines of the fourth color plane.

12. The method of claim 11, wherein the fourth initial scan line has a width that is equal to the width of the pixel, and wherein the fourth initial scan line is disposed on the transfer medium such that the fourth initial scan line is not more than one pixel offset from the first, second, and third initial scan lines.

13. The method of claim 1, wherein said selecting includes comparing the first time interval with a beam detection period to select the first one of the plurality of light beam sources, said beam detection period being an amount of time between two successive detections of light beams from the same light beam source during two successive cross scans of the transfer medium.

14. The method of claim 13, wherein:
the plurality of light beam sources include N light beam sources where N is an integer; and
said comparing includes dividing the beam detection period into N time increments, associating each time increment to a corresponding one of the N light beam sources, and determining that the first time interval is within a time increment associated with the first one of the plurality of light beam sources.

15. The method of claim 14, wherein said N time increments are equivalent time increments.

16. The method of claim 13, wherein:
the plurality of light beam sources include N light beam sources, where N is an integer; and
said comparing includes dividing the beam detection period into N+1 time increments, associating each time increment to a corresponding one of the N light beam sources, and determining that the first time interval is within a time increment associated with the first one of the plurality of light beam sources.

17. The method of claim 1, wherein said detection of the at least one light beam from the multi-beam device and the detection of the top of the page at the selected location of the transfer medium occur during a single cross scan of the transfer medium.

18. The method of claim 17, wherein said at least one light beam from the multi-beam device is detected using a first sensor and the top of the page is detected using a second sensor.

19. The method of claim 1, where each of the plurality of light beam sources corresponds to a respective color plane.

20. A method for operating a multi-beam printer, the multi-beam printer having a multi-beam device including a plurality of light beam sources, the method comprising:
detecting at least one light beam;
detecting a top of a page at a selected location of a transfer medium; and
selecting, based at least in part on said detection of the at least one beam and the detection of the top of the page, one of the plurality of light beam sources to begin illuminating the transfer medium to create a color plane on the transfer medium, said color plane being one of a plurality of color planes comprising a latent image.

21. The method of claim 20, wherein said detecting of the at least one light beam and said detecting of the top of the page occurring during a cross scan of the transfer medium by the multi-beam device.

22. The method of claim 20, wherein said selecting is based on a comparison of said detecting of the at least one light beam with said detecting of the top of the page.

23. The method of claim 20, further comprising forming an initial scan line of the color plane at a selected distance away from the location of the top of the page with the selected one of the plurality of light beam sources, the color plane having a plurality of scan lines including the initial scan line, and the initial scan line being nearest to the top of the page relative to the other scan lines of the color plane.

24. An apparatus, comprising:
a transfer medium to print an image onto a print medium;
a multi-beam device having a plurality of light beam sources;
a first sensor to detect at least one light beam generated by the multi-beam device;
a second sensor to detect a top of a page located at a selected location on the transfer medium; and
a controller to control the multi-beam device and to receive inputs from the first sensor and the second sensor, the controller configured to:
determine, during a first pass of the transfer medium, a first time interval between when at least one light beam from the multi-beam device is detected by the first sensor and when the top of the page is detected at a selected location of the transfer medium by the second sensor, said first pass to form a first color plane of a latent image on the transfer medium; and
select, based at least in part on the determined first time interval, a first one of the plurality of light beam sources to begin illuminating the transfer medium to create the first color plane on the transfer medium during the first pass of the transfer medium.

25. The apparatus of claim 24, wherein said controller is further configured to control the multi-beam device to form a first initial scan line of the first color plane at a first selected distance away from the location of the top of the page with the selected first one of the plurality of light beam sources, the first color plane having a plurality of scan lines including the first initial scan line, and the first initial scan line being nearest to the top of the page relative to the other scan lines of the first color plane.

26. The apparatus of claim 25, wherein said controller is further configured to identify a cross scan from a plurality of cross scans and to control the multi-beam device to form the first initial scan line of the first color plane during said identified cross scan.

27. The apparatus of claim 25, wherein said controller is further configured to:
determine, during a second pass of the transfer medium to form a second color plane on the transfer medium, a second time interval between when at least one light beam from the multi-beam device is detected by the first sensor and when the top of the page is detected at the selected location of the transfer medium by the second sensor; and
select, based at least in part on said determined second time interval, a second one of the plurality of light beam sources to begin illuminating the transfer medium to create the second color plane on the transfer medium during the second pass of the transfer medium.

28. The apparatus of claim 27, wherein said controller is further configured to control the multi-beam device to form a second initial scan line of the second color plane at a second selected distance away from the location of the top of the page with the selected second one of the plurality of light beam sources, the second color plane having a plurality of scan lines including the second initial scan line, and the second initial scan line being nearest to the top of the page relative to the other scan lines of the second color plane.

29. The apparatus of claim 28, wherein each of the first initial scan line and the second initial scan line respectively has a first width and a second width, wherein each of the first width and the second width is equal to a width of a pixel, and wherein the second initial scan line is disposed on the transfer medium such that the second initial scan line is not more than one pixel offset from the first initial scan line.

30. The apparatus of claim 28, wherein said controller is further configured to:
determine, during a third pass of the transfer medium to form a third color plane on the transfer medium, a third time interval between when at least one light beam from the multi-beam device is detected and when the top of the page is detected at the selected location of the transfer medium, and
select, based at least in part on said determined third time interval, a third one of the plurality of light beam sources to begin illuminating the transfer medium to create the third color plane on the transfer medium during the third pass of the transfer medium.

31. The apparatus of claim 30, wherein said controller is further configured to control the multi-beam device to form a third initial scan line of the third color plane at a third selected distance away from the location of the top of the page with the selected third one of the plurality of light beam sources, the third color plane having a plurality of scan lines including the third initial scan line, and the third initial scan line being nearest to the top of the page relative to the other scan lines of the third color plane.

32. The apparatus of claim 31, wherein the third initial scan line has a width that is equal to the width of the pixel, and the third initial scan line is disposed on the transfer medium such that the third initial scan line is not more than one pixel offset from the first and second initial scan lines.

33. The apparatus of claim 31, wherein said controller is further configured to:
determine, during a fourth pass of the transfer medium to form a fourth color plane on the transfer medium, a fourth time interval between when at least one light beam from the multi-beam device is detected and when the top of the page is detected at the selected location of the transfer medium is detected, and
select, based at least in part on said determined fourth time interval, a second one of the plurality of light beam sources to begin illuminating the transfer medium to create the fourth color plane on the transfer medium during the fourth pass of the transfer medium.

34. The apparatus of claim 33, wherein said controller is further configured to control the multi-beam device to form a fourth initial scan line of the fourth color plane at a fourth selected distance away from the location of the top of the page with the selected fourth one of the plurality of light beam sources, the fourth color plane having a plurality of scan lines including the fourth initial scan line, and the fourth initial scan line being nearest to the top of the page relative to the other scan lines of the fourth color plane.

35. The apparatus of claim 34, wherein the fourth initial scan line has a width that is equal to the width of the pixel, and the fourth initial scan line is disposed on the transfer medium such that the fourth initial scan line is not more than one pixel offset from the first, second, and third initial scan lines.

36. The apparatus of claim 24, wherein said controller is further configured to:
determine a beam detection period based on input provided by the first sensor, the beam detection period being an amount of time between two successive detections of light beams from the same light beam source during two successive cross scans of the transfer medium, and
select the first one of the plurality of light beam sources by comparing the first time interval with the determined beam detection period.

37. The apparatus of claim 36, wherein:
the plurality of light beam sources include N light beam sources where N is an integer; and
said controller is further configured to
select the first one of the plurality of light beam sources by dividing the beam detection period into N time increments,
associate each time increment to a corresponding one of the plurality of light sources, and
determine that the first time interval is within a time increment associated with the first one of the plurality of light beam sources.

38. The apparatus of claim 37, wherein said N time increments are equivalent time increments.

39. The apparatus of claim 36, wherein:
the plurality of light beam sources include N light beam sources where N is an integer; and
said controller is further configured to
select the first one of the plurality of light beam sources by dividing the beam detection period into N+1 time increments,
associate each time increment to a corresponding one of the plurality of light sources, and
determine that the first time interval is within a time increment associated with the first one of the plurality of light beam sources.

40. The apparatus of claim 24, wherein said detection of the at least one light beam from the multi-beam device and the detection of the top of the page at the selected location occur during a single cross scan of the transfer medium.

41. The apparatus of claim 40, wherein said plurality of light beam sources are laser diodes.

42. A controller for controlling an apparatus comprising a transfer medium to print an image onto a print medium and a multibeam device having a plurality of light beam sources, the controller being configured to:
receive inputs from a first and a second sensor;
determine, during a first pass of the transfer medium, a first time interval between when at least one light beam from the multibeam device is detected by the first sensor and when the top of the page is detected at a selected location of the transfer medium by the second sensor, said first pass to form a first color plane of a latent image on the transfer medium; and
select, based at least in part on the determined first time interval, a first one of the plurality of light beam sources to begin illuminating the transfer medium to create the first color plane on the transfer medium during the first pass of the transfer medium.

43. The controller of claim 42, wherein said controller is further configured to control the multibeam device to form a first initial scan line of the first color plane at a first selected distance away from the location of the top of the page with the selected first one of the plurality of light beam sources, the first color plane having a plurality of scan lines including the first initial scan line, and the first initial scan line being nearest to the top of the page relative to the other scan lines of the first color plane.

44. The controller of claim 43, wherein said controller is further configured to identify a cross scan from a plurality of cross scans and to control the multibeam device to form the first initial scan line of the first color plane during said identified cross scan.

45. The controller of claim 43, wherein said controller is further configured to:
determine, during a second pass of the transfer medium to form a second color plane on the transfer medium, a second time interval between when at least one light beam from the multibeam device is detected by the first sensor and when the top of the page is detected at the selected location of the transfer medium by the second sensor; and select, based at least in part on said determined second time interval, a second one of the plurality of light beam sources to begin illuminating the transfer medium to create the second color plane on the transfer medium during the second pass of the transfer medium.

46. The controller of claim 45, wherein said controller is further configured to control the multibeam device to form a second initial scan line of the second color plane at a second selected distance away from the location of the top of the page with the selected second one of the plurality of light beam sources, the second color plane having a plurality of scan lines including the second initial scan line, and the second initial scan line being nearest to the top of the page relative to the other scan lines of the second color plane.

47. The controller of claim 46, wherein each of the first initial scan line and the second initial scan line respectively has a first width and a second width, wherein each of the first width and the second width is equal to a width of a pixel, and wherein the second initial scan line is disposed on the transfer medium such that the second initial scan line is not more than one pixel offset from the first initial scan line.

48. The controller of claim 46, wherein said controller is further configured to:
determine, during a third pass of the transfer medium to form a third color plane on the transfer medium, a third time interval between when at least one light beam from the multibeam device is detected and when the top of the page is detected at the selected location of the transfer medium, and
select, based at least in part on said determined third time interval, a third one of the plurality of light beam sources to begin illuminating the transfer medium to create the third color plane on the transfer medium during the third pass of the transfer medium.

49. The controller of claim 48, wherein said controller is further configured to control the multibeam device to form a third initial scan line of the third color plane at a third selected distance away from the location of the top of the page with the selected third one of the plurality of light beam sources, the third color plane having a plurality of scan lines including the third initial scan line, and the third initial scan line being nearest to the top of the page relative to the other scan lines of the third color plane.

50. The controller of claim 49, wherein the third initial scan line has a width that is equal to the width of the pixel, and the third initial scan line is disposed on the transfer medium such that the third initial scan line is not more than one pixel offset from the first and second initial scan lines.

51. The controller of claim 50, wherein said controller is further configured to:
determine, during a fourth pass of the transfer medium to form a fourth color plane on the transfer medium, a fourth time interval between when at least one light beam from the multibeam device is detected and when the top of the page is detected at the selected location of the transfer medium is detected, and
select, based at least in part on said determined fourth time interval, a second one of the plurality of light beam sources to begin illuminating the transfer medium to create the fourth color plane on the transfer medium during the fourth pass of the transfer medium.

52. The controller of claim 51, wherein said controller his further configured to control the multibeam device to form a fourth initial scan line of the fourth color plane at a fourth selected distance away from the location of the top of the page with the selected fourth one of the plurality of light beam sources, the fourth color plane having a plurality of scan lines including the fourth initial scan line, and the fourth initial scan line being nearest to the top of the page relative to the other scan lines of the fourth color plane.

53. The controller of claim 52, wherein the fourth initial scan line has a width that is equal to the width of the pixel, and the fourth initial scan line is disposed on the transfer medium such that the fourth initial scan line is not more than one pixel offset from the first, second, and third initial scan lines.

54. The controller of claim 42, wherein said controller is further configured to:
determine a beam detection period based on input provided by the first sensor, the beam detection period being an amount of time between two successive detections of light beams from the same light beam source during two successive cross scans of the transfer medium, and
select the first one of the plurality of light beam sources by comparing the first time interval with the determined beam detection period.

55. The controller of claim 54, wherein:
the plurality of light beam sources include N light beam sources, where N is an integer; and
said controller is further configured to
select the first one of the plurality of light beam sources by dividing the beam detection period into N time increments,
associate each time increment to a corresponding one of the plurality of light sources, and
determine that the first time interval is within a time increment associated with the first one of the plurality of light beam sources.

56. The controller of claim 55, wherein said N time increments are equivalent time increments.

57. The controller of claim 54, wherein:
the plurality of light beam sources include N light beam sources where N is an integer; and
said controller is further configured to
select the first one of the plurality of light beam sources by dividing the beam detection period into N+1 time increments,
associate each time increment to a corresponding one of the plurality of light sources, and
determine that the first time interval is within a time increment associated with the first one of the plurality of light beam sources.

58. The controller of claim 42, wherein said detection of the at least one light beam from the multibeam device and the detection of the top of the page at the selected location occur during a single cross scan of the transfer medium.

\* \* \* \* \*